(12) United States Patent
Kinzuka

(10) Patent No.: US 10,974,584 B2
(45) Date of Patent: Apr. 13, 2021

(54) DEVICE AND METHOD FOR CONTROLLING HYBRID SYSTEM

(71) Applicant: VOLVO TRUCK CORPORATION, Gothenburg (SE)

(72) Inventor: Naoto Kinzuka, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 207 days.

(21) Appl. No.: 16/060,970

(22) PCT Filed: Dec. 16, 2015

(86) PCT No.: PCT/JP2015/085293
§ 371 (c)(1),
(2) Date: Jun. 11, 2018

(87) PCT Pub. No.: WO2017/104033
PCT Pub. Date: Jun. 22, 2017

(65) Prior Publication Data
US 2018/0361844 A1     Dec. 20, 2018

(51) Int. Cl.
*B60K 6/485* (2007.10)
*F02D 23/00* (2006.01)
(Continued)

(52) U.S. Cl.
CPC ............ *B60K 6/485* (2013.01); *B60K 6/24* (2013.01); *B60K 6/26* (2013.01); *B60K 6/48* (2013.01);
(Continued)

(58) Field of Classification Search
CPC ......... F02D 23/00; F02D 23/02; B60K 6/485; F02B 39/10
See application file for complete search history.

(56) References Cited

U.S. PATENT DOCUMENTS 6,684,863 B2 * 2/2004 Dixon .................... F02B 39/10
                                                    123/559.1
7,628,015 B2 * 12/2009 Marumoto ............. F02B 33/34
                                                    60/607
(Continued)

FOREIGN PATENT DOCUMENTS

CN       105102792 A      11/2015
DE     102008035451 A1     3/2009
(Continued)

OTHER PUBLICATIONS

Japanese Office Action dated Oct. 1, 2019 in corresponding JP Application No. 2017-555935, 4 pages.
(Continued)

*Primary Examiner* — Katy M Ebner
(74) *Attorney, Agent, or Firm* — Venable LLP; Jeffri A. Kaminski

(57) ABSTRACT

A controller is provided for a hybrid system including an electric supercharger, a motor generator, and an energy storage system for supplying electric power to the electric supercharger and the motor generator controls the electric supercharger (and the motor generator in accordance with a required torque. Specifically, even when the required torque can be achieved by an engine alone, the controller for the hybrid system activates at least one of the electric supercharger and the motor generator to provide torque assist to the engine when the state of charge of the energy storage system is sufficiently high.

10 Claims, 9 Drawing Sheets

(51) Int. Cl.
  *B60K 6/24* (2007.10)
  *B60K 6/26* (2007.10)
  *B60W 10/08* (2006.01)
  *B60W 20/00* (2016.01)
  *B60W 10/06* (2006.01)
  *F02B 39/10* (2006.01)
  *F02D 41/24* (2006.01)
  *F02D 41/00* (2006.01)
  *B60W 20/11* (2016.01)
  *B60K 6/48* (2007.10)
  *F02D 11/10* (2006.01)
  *F02B 37/04* (2006.01)

(52) U.S. Cl.
  CPC ............ *B60W 10/06* (2013.01); *B60W 10/08* (2013.01); *B60W 20/00* (2013.01); *B60W 20/11* (2016.01); *F02B 39/10* (2013.01); *F02D 23/00* (2013.01); *F02D 41/0007* (2013.01); *F02D 41/2422* (2013.01); B60K 2006/4825 (2013.01); B60W 2510/244 (2013.01); B60W 2520/10 (2013.01); B60W 2710/0666 (2013.01); B60W 2710/083 (2013.01); F02B 37/04 (2013.01); F02D 11/105 (2013.01); F02D 2200/501 (2013.01)

(56) References Cited

U.S. PATENT DOCUMENTS

| | | | | |
|---|---|---|---|---|
| 7,775,310 B2* | 8/2010 | Andri | ............... | B60K 6/48 180/65.28 |
| 7,867,133 B2* | 1/2011 | Petridis | ............... | B60K 6/24 477/3 |
| 9,133,761 B2* | 9/2015 | McDonald-Walker | ............... | B60K 6/24 |
| 9,534,531 B2* | 1/2017 | Benjey | ............... | F02D 41/0007 |
| 9,695,740 B2* | 7/2017 | Xiao | ............... | F02B 37/14 |
| 9,776,625 B2* | 10/2017 | Yukawa | ............... | B60L 50/16 |
| 10,024,225 B2* | 7/2018 | Akashi | ............... | F02B 33/34 |
| 10,100,690 B2* | 10/2018 | Caine | ............... | F02D 41/0255 |
| 10,125,698 B2* | 11/2018 | Benjey | ............... | F02B 39/06 |
| 2003/0145597 A1 | 8/2003 | Kusase | | |

FOREIGN PATENT DOCUMENTS

| | | |
|---|---|---|
| DE | 102012004394 A1 | 9/2013 |
| EP | 1749990 A2 | 2/2007 |
| GB | 2456841 A | 7/2009 |
| JP | H11332015 A | 11/1999 |
| JP | 2004076687 A | 3/2004 |
| JP | 2005171842 A | 6/2005 |
| JP | 2005240580 A | 9/2005 |
| JP | 2005240580 A * | 9/2005 |
| JP | 2005330818 A | 12/2005 |
| JP | 2005337176 A | 12/2005 |
| JP | 2013181393 A | 9/2013 |
| JP | 2015514624 A | 5/2015 |
| WO | 2014165233 A1 | 10/2014 |
| WO | WO-2014165233 A1 * | 10/2014 ........... B60W 40/09 |
| WO | 2016042217 A1 | 3/2016 |

OTHER PUBLICATIONS

Extended European Search Report dated Aug. 14, 2019 in corresponding European Patent Application No. EP 15910723.4.
International Search Report (dated Mar. 1, 2016) for corresponding International App PCT/JP2015/085293.
China Office Action dated Oct. 30, 2020 in corresponding China Patent Application No. 201580085401.4, 21 pages.

* cited by examiner

DEVICE AND METHOD FOR CONTROLLING HYBRID SYSTEM

BACKGROUND AND SUMMARY

The present invention relates to a controller for a hybrid system and to a method for controlling a hybrid system including an electric supercharger, a motor generator, and an energy storage system for supplying electric power to the electric supercharger and motor generator.

Conventionally, a hybrid system as disclosed in JP 2005-171842 A (Patent Document 1) has been proposed for the purpose of improving fuel economy. In such a conventional hybrid system, the electric supercharger and motor generator are controlled to provide the engine with torque assist depending on comparison between a base torque that can be achieved by the engine alone and a required torque.

REFERENCE DOCUMENT LIST

Patent Document 1 JP 2005-171842 A

In a hybrid system, expanding the region in which the electric supercharger and motor generator are activated will reduce the amount of fuel injected into the engine and thus is expected to further improve fuel economy. However, simply expanding the region in which the electric supercharger and motor generator are activated, in turn, increases electric power consumption by the electric supercharger and motor generator. As a result, fuel consumption for charging the energy storage system increases. This makes difficult to improve fuel economy by this method.

It is desirable to provide a controller for a hybrid system and a method for controlling a hybrid system that can further improve fuel economy.

A controller for a hybrid system including an electric supercharger, a motor generator, and an energy storage system for supplying electric power to the electric supercharger and motor generator controls the electric supercharger and motor generator in accordance with a required torque. Specifically, even when the required torque can be achieved by an engine alone, the controller for the hybrid system activates at least one of the electric supercharger and motor generator to provide torque assist to the engine when the state of charge of the energy storage system is sufficiently high.

According to an aspect of the present invention, it is possible to further improve fuel economy of the hybrid system.

DETAILED DESCRIPTION

Figure 1:
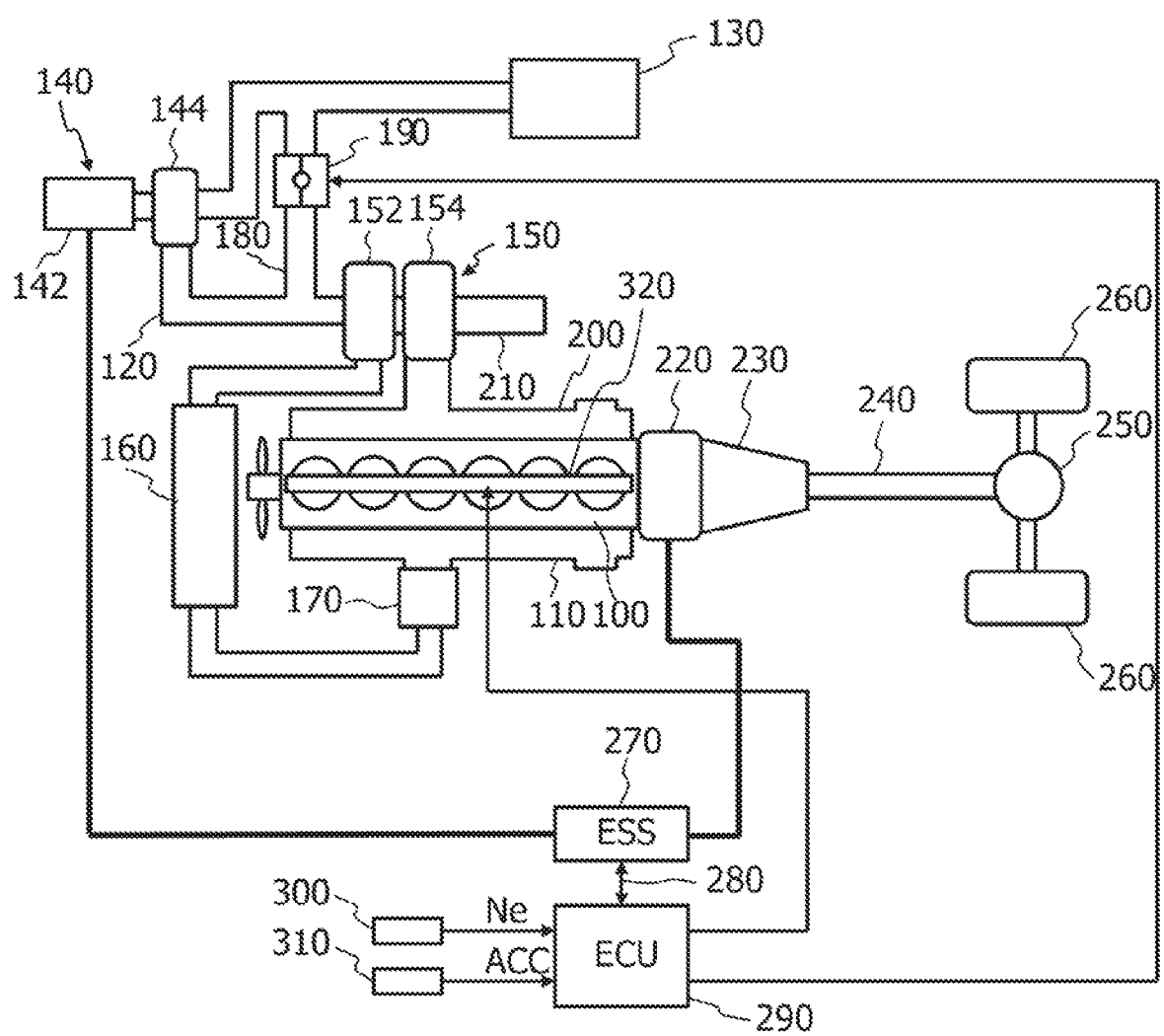
FIG. 1 schematically shows an exemplary hybrid system.

An embodiment for implementing the present invention will be described below with reference to the accompanying drawings. FIG. 1 shows an exemplary hybrid system installed in a vehicle such as a truck.

On an intake pipe 120 connected to an intake manifold 110 of a diesel engine 100, an air cleaner 130, an electric supercharger 140, a compressor 152 of a turbocharger 150, an intercooler 160, and an intake throttle 170 are disposed in this order along the intake flow direction. Here, the engine to which the present disclosure may be applied is not limited to the diesel engine 100 but may be a gasoline engine. Note that the electric supercharger 140 can alternatively be disposed between the compressor 152 and the intercooler 160, between the intercooler 160 and the intake manifold 110, or the like.

The air cleaner 130 filters dust and the like in intake air with an air element (not shown) to remove it. The electric supercharger 140 rotates a compressor 144 with an electric motor 142 such as a brushless motor, and supercharges the intake air from which dust or the like has been removed by the air cleaner 130. The turbocharger 150 supercharges intake air with the compressor 152 rotated by exhaust energy. The intercooler 160 cools the intake air that has passed through the compressor 152 using, for example, wind generated by the movement of the vehicle and/or cooling water. The intake throttle 170 reduces vibrations generated while the diesel engine 100 stops by, for example, reducing the intake when the diesel engine 100 stops.

In parallel with the intake pipe 120 of the diesel engine 100, a bypass passage 180 for bypassing the compressor 144 of the electric supercharger 140 is provided. The bypass passage 180 is provided with a remotely controllable flow channel switching valve 190 for opening and closing the intake flow channel at least to the fully opened state and the fully closed state. Here, as the flow channel switching valve 190, a butterfly valve or the like having a valve element rotated by an actuator such as a servomotor can be used, for example.

Thus, when the flow channel switching valve 190 is fully opened, the entire amount of intake air that has passed through the air cleaner 130 directly enters the compressor 152 of the turbocharger 150 without passing through the compressor 144 of the electric supercharger 140. On the other hand, when the flow channel switching valve 190 is fully closed, the entire amount of intake air that has passed through the air cleaner 130 passes through the compressor 144 of the electric supercharger 140 and then enters the compressor 152 of the turbocharger 150. When the flow channel switching valve 190 is set to an intermediate opening between the fully opened state and the fully closed state, the intake air that has passed through the air cleaner 130 is split into two streams: one being toward the compressor 144 of the electric supercharger 140, and the other being toward the compressor 152 of the turbocharger 150. The ratio between the flow rates through these streams depends on the opening of the flow channel switching valve 190.

On an exhaust pipe 210 connected to an exhaust manifold 200 of the diesel engine 100, a turbine 154 of the turbocharger 150 and an exhaust purifier (not shown) are disposed in this order along the exhaust flow direction. The turbine 154 of the turbocharger 150, which is rotated by the exhaust flowing through the exhaust pipe 210, rotates the compressor 152 coupled to the turbine 154 via a shaft (not shown). The exhaust purifier selectively reduces and purifies nitrogen oxides in the exhaust by, for example, using a urea aqueous solution as a reducing agent precursor.

A transmission 230 such as a constant mesh transmission is mounted to the output shaft of the diesel engine 100 via a clutch or a torque converter (not shown) and a motor generator 220. Via a propeller shaft 240 and a differential carrier 250, the output shaft of the transmission 230 is coupled to a pair of right and left rear wheels 260, which serve as driven wheels. Alternatively, the motor generator 220 may be arranged in parallel with the transmission 230, for example.

Furthermore, an energy storage system (ESS) 270 is installed at a predetermined portion of the vehicle. The energy storage system 270 supplies electric power to the electric motor 142 of the electric supercharger 140 and motor generator 220, and stores electric power generated by the motor generator 220. Via an on-board network 280 such as a controller area network (CAN), the energy storage system 270 is communicably connected to an electronic controller 290 containing a microcomputer. Here, the electronic controller 290 may be an example of a controller.

Figure 2:
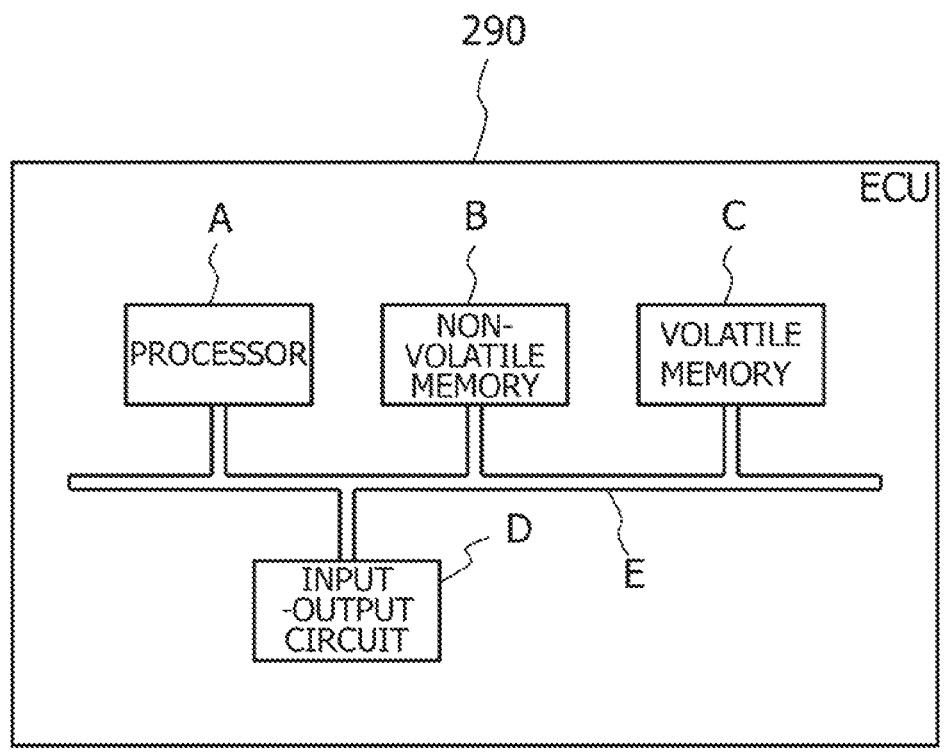
FIG. 2 shows the internal structure of an exemplary electronic controller.

As shown in FIG. 2, the electronic controller 290 includes a processor A such as a central processing unit (CPU), a nonvolatile memory B such as a flash read only memory (ROM), a volatile memory C such as a random access memory (RAM), an input-output circuit D serving as an interface to external devices such as various sensors, and a bus E communicably connecting these with each other.

The electronic controller 290 receives output signals of a rotation speed sensor 300 and an accelerator opening sensor 310. The rotation speed sensor 300 senses a rotation speed Ne of the diesel engine 100. The accelerator opening sensor 310 senses an opening (accelerator opening) ACC of the accelerator pedal (not shown). From the energy storage system 270, the electronic controller 290 further receives the state of charge (SOC) of the energy storage system 270. Alternatively, the electronic controller 290 may read the rotation speed Ne and the accelerator opening ACC from another electronic controller (not shown) communicably connected to the electronic controller 290 via the on-board network 280.

The electronic controller 290 electronically controls the electric supercharger 140, the motor generator 220, and the diesel engine 100 by outputting control signals based on the rotation speed Ne, the accelerator opening ACC and the state of charge SOC to the flow channel switching valve 190, the energy storage system 270, and a fuel injection device 320 in accordance with a control program stored in the nonvolatile memory B.

Figure 3:
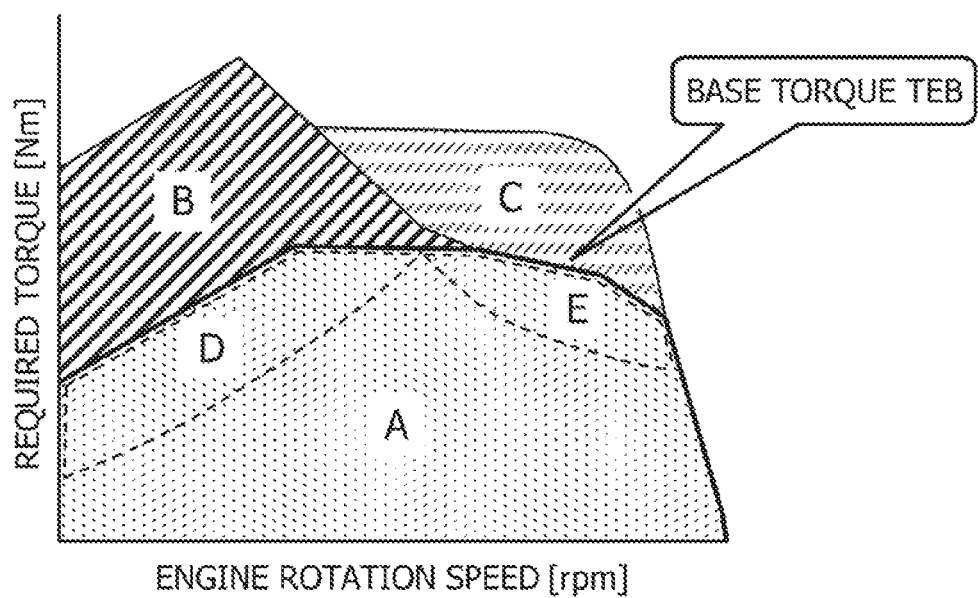
FIG. 3 illustrates an exemplary torque map.

The nonvolatile memory B of the electronic controller 290 stores a torque map shown in FIG. 3. The torque map defines the torque sharing between the engine alone, the electric supercharger 140, and the motor generator 220 depending on the engine rotation speed and the required torque. For example, the torque map is configured according to the characteristics of the diesel engine 100, the electric supercharger 140, the motor generator 220, and the like. Here, the term "engine alone" does not refer to the diesel engine 100 alone but does collectively refer to the diesel engine 100 and the turbocharger 150 integrated therewith. Below, in the torque map, the torque allocation region for the diesel engine 100 will be referred to as a region A, the torque allocation region for the electric supercharger 140 will be referred to as a region B, and the torque allocation region of the motor generator 220 will be referred to as a region C.

The torque map also includes regions D and E defined for providing torque assist to the engine by activating the electric supercharger 140 and motor generator 220 even when the required torque can be achieved by the engine alone in order to further improve the fuel economy. In the torque map shown in FIG. 3, the region D represents a region in which torque assist may be provided by the electric supercharger 140, the region E represents a region in which torque assist may be provided by the motor generator 220. The regions D and E may be set according to the characteristics of the electric supercharger 140, the motor generator 220, and the energy storage system 270, for example.

When the diesel engine 100 transitions to a steady operation state while the vehicle is traveling, the electronic controller 290 calculates the required torque based on the accelerator opening ACC and determines whether the required torque can be achieved by the engine alone. When determining that the required torque can be achieved by the engine alone, and when the state of charge SOC of the energy storage system 270 is sufficiently high, the electronic controller 290 activates at least one of the electric supercharger 140 and motor generator 220 to provide torque assist to the engine. In addition, the electronic controller 290 reduces the amount of fuel to be injected by the fuel injection device 320 in accordance with the amount of the torque assist provided to the engine.

Figure 4:
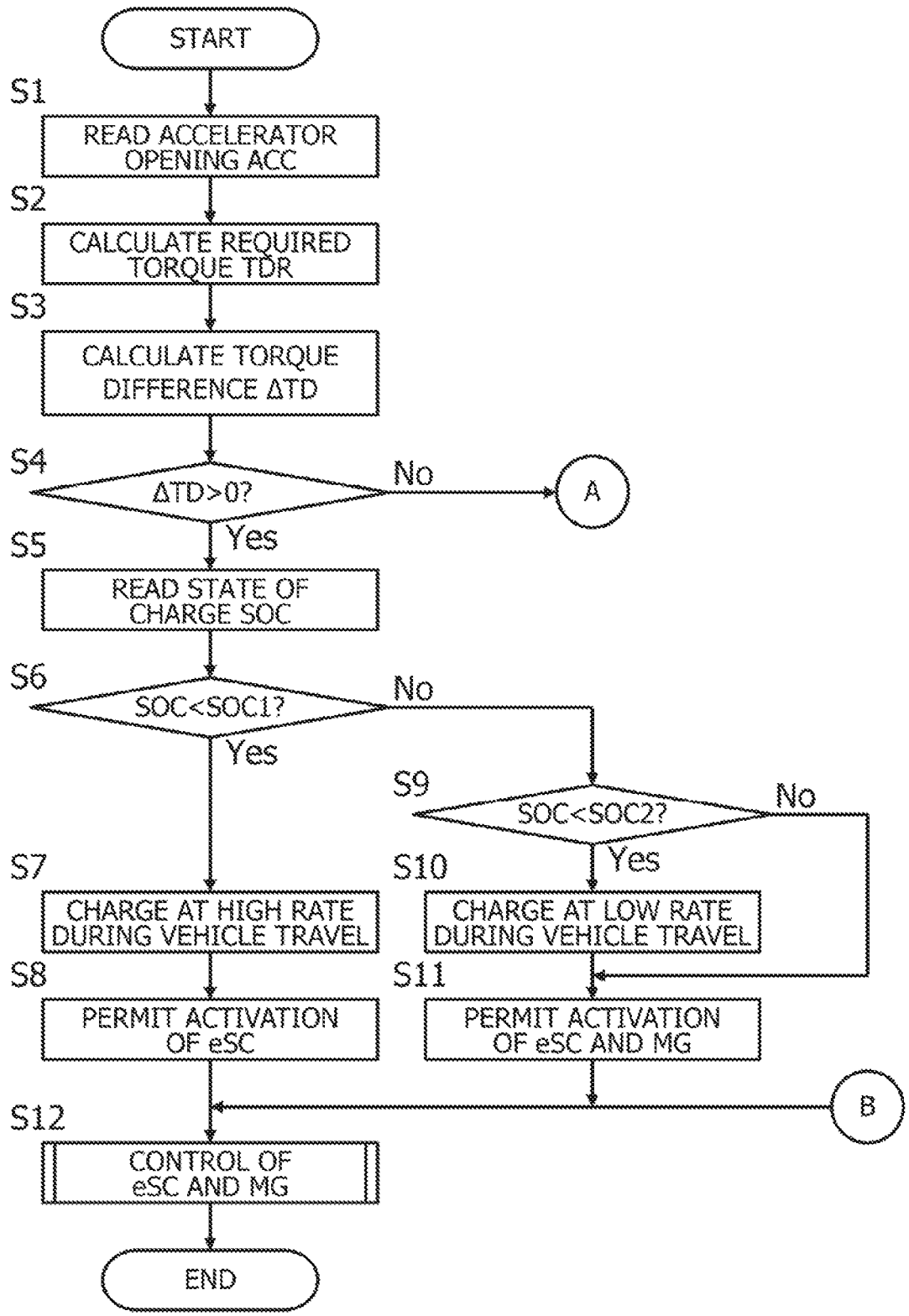
FIG. 4 is a flowchart of an exemplary main routine of a control program.
Figure 5:
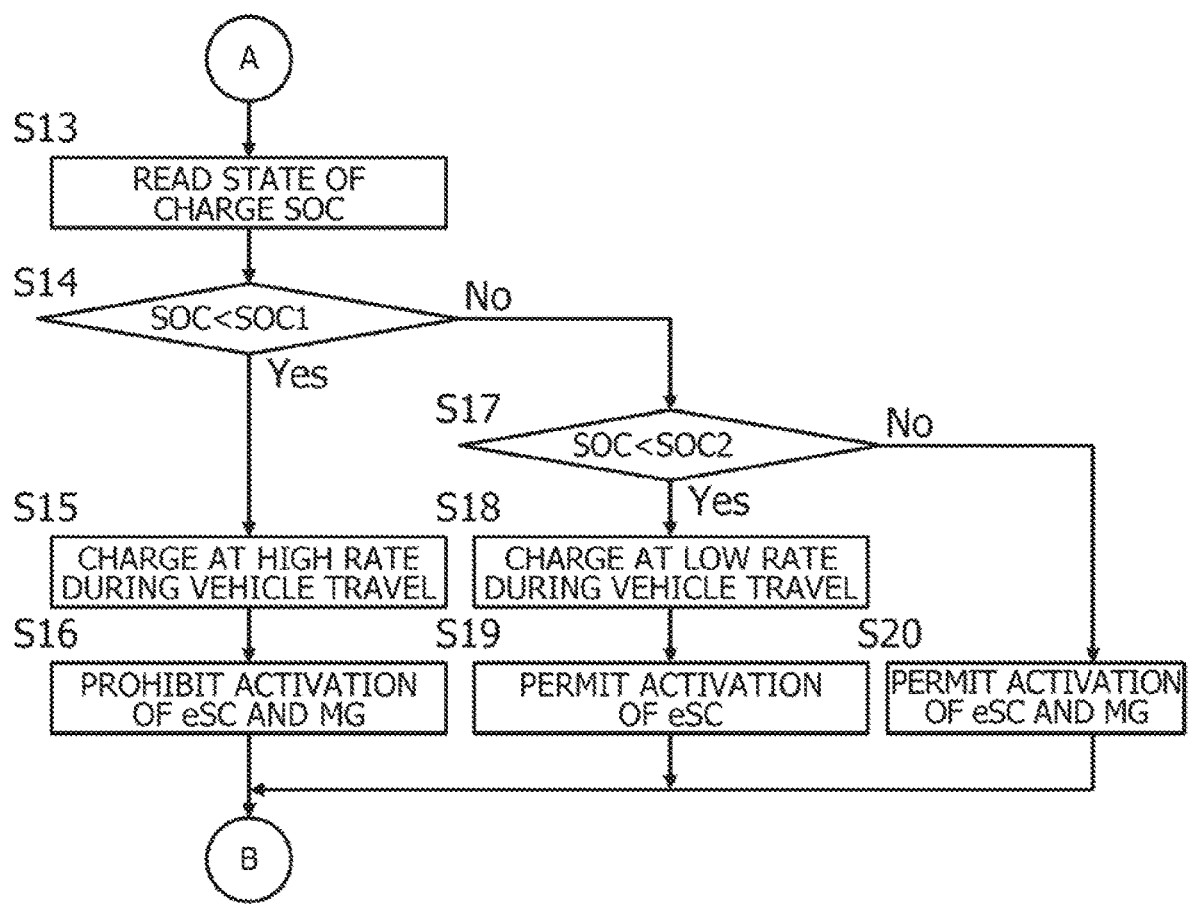
FIG. 5 is a flowchart of the exemplary main routine of the control program.

FIGS. 4 and 5 show an exemplary main routine of the control program that starts to be executed by the processor A of the electronic controller 290 when the diesel engine 100 transitions to the steady operation state while the vehicle is traveling, and then repeatedly executed at predetermined time intervals t1. As used herein, the steady operation state of the diesel engine 100 refers to a state in which the rotation speed and required torque of the diesel engine 100 are substantially constant with minor permissible variations depending on the output characteristics of the sensors.

In step 1 (abbreviated as "S1" in FIG. 4; the same applies below), the processor A of the electronic controller 290 reads the accelerator opening ACC from the accelerator opening sensor 310. In step 2, the processor A of the electronic controller 290 calculates the required torque TDR corresponding to the accelerator opening ACC by, for example, referring to a map (not shown) that provides a correspondence between the required torque and the accelerator opening.

In step 3, the processor A of the electronic controller 290 calculates a torque difference $\Delta TD$ ($\Delta TD=TDR-TEB$) by subtracting a base torque TEB from the required torque TDR. Here, the base torque TEB is indicated by thick line that separates the region A from the regions B and C in the torque map shown in FIG. 3, i.e., corresponds to a torque that can be achieved by the engine alone.

In step 4, the processor A of the electronic controller 290 determines whether or not the torque difference $\Delta TD$ is positive, i.e., whether or not the required torque TDR can be achieved by the engine alone. When the processor A of the electronic controller 290 determines that the torque difference $\Delta TD$ is positive, i.e., that the required torque TDR cannot be achieved by the engine alone (Yes), the operation proceeds to step 5. On the other hand, when the processor A of the electronic controller 290 determines that the torque difference $\Delta TD$ is 0 or negative, i.e., that the required torque TDR can be achieved by the engine alone (No), the operation proceeds to step 13.

In step 5, the processor A of the electronic controller 290 reads the state of charge SOC from the energy storage system 270. In step 6, the processor A of the electronic controller 290 determines whether or not the state of charge SOC is below a first predetermined value SOC1. Here, the first predetermined value SOC1 is a threshold value for determining whether or not the state of charge SOC of the energy storage system 270 decreases much to a level at which the activation of both the electric supercharger 140 and motor generator 220 is difficult. For example, the first predetermined value SOC1 may be set in consideration of the storage capacity of the energy storage system 270 as well as the electric power consumption of the electric supercharger 140 and motor generator 220. When the processor A of the electronic controller 290 determines that the state of charge SOC is below the first predetermined value SOC1 (Yes), the operation proceeds to step 7. On the other hand, when the processor A of the electronic controller 290 determines that the state of charge SOC is equal to or above the first predetermined value SOC1 (No), the operation proceeds to step 9.

In step 7, the processor A of the electronic controller 290 causes a large charging current to be supplied to the energy storage system 270 by, for example, increasing the amount of fuel injected by the fuel injection device 320 and thus increasing power generation of the motor generator 220. In other words, the processor A of the electronic controller 290 causes the motor generator 220 to charge the energy storage system 270 with a fuel injection amount added in accordance with the state of charge SOC of the energy storage system 270 (the same applies below).

In step 8, the processor A of the electronic controller 290 permits the activation of the electric supercharger 140. Here, the activation permission or prohibition of the electric supercharger 140 can be provided by, for example, changing a permission flag stored in the volatile memory C of the electronic controller 290 (the same applies below). After that, the operation proceeds to step 12.

In step 9, the processor A of the electronic controller 290 determines whether or not the state of charge SOC is below a second predetermined value SOC2, i.e., whether or not the state of charge SOC is equal to or above the first predetermined value SOC1 and below the second predetermined value SOC2. Here, the second predetermined value SOC2 is a threshold value for determining whether or not the state of charge SOC of the energy storage system 270 decreases to a level at which the activation of the electric supercharger 140 is possible but the activation of the motor generator 220 is difficult. For example, the second predetermined value SOC2 may be set in consideration of the storage capacity of the energy storage system 270 as well as the electric power consumption of the electric supercharger 140 and motor generator 220. When the processor A of the electronic controller 290 determines that the state of charge SOC is below the second predetermined value SOC2 (Yes), the operation proceeds to step 10. On the other hand, when the processor A of the electronic controller 290 determines that the state of charge SOC is equal to or above the second predetermined value SOC2, i.e., that the state of charge SOC of the energy storage system 270 is sufficiently high (No), the operation proceeds to step 11.

In step 10, the processor A of the electronic controller 290 causes a small charging current to be supplied to the energy storage system 270 by, for example, slightly increasing the amount of fuel injected by the fuel injection device 320 and thus slightly increasing power generation of the motor generator 220.

In step 11, the processor A of the electronic controller 290 permits the activation of both the electric supercharger 140 and motor generator 220. After that, the operation proceeds to step 12.

In step 12, the processor A of the electronic controller 290 executes a subroutine for controlling the electric supercharger 140 and motor generator 220. The details of this subroutine will be described later.

In step 13, the processor A of the electronic controller 290 reads the state of charge SOC from the energy storage system 270. In step 14, the processor A of the electronic controller 290 determines whether or not the state of charge SOC is below the first predetermined value SOC1. When the processor A of the electronic controller 290 determines that the state of charge SOC is below the first predetermined value SOC1 (Yes), the operation proceeds to step 15. On the other hand, when the processor A of the electronic controller 290 determines that the state of charge SOC is equal to or above the first predetermined value SOC1 (No), the operation proceeds to step 17.

In step 15, the processor A of the electronic controller 290 causes a large charging current to be supplied to the energy storage system 270. In step 16, the processor A of the electronic controller 290 prohibits the activation of both the electric supercharger 140 and motor generator 220 since the state of charge SOC of the energy storage system 270 has decreased to be close to zero.

In step 17, the processor A of the electronic controller 290 determines whether or not the state of charge SOC is below the second predetermined value SOC2. When the processor A of the electronic controller 290 determines that the state of charge SOC is below the second predetermined value SOC2 (Yes), the operation proceeds to step 18. On the other hand, when the processor A of the electronic controller 290 determines that the state of charge SOC is equal to or above the second predetermined value SOC2 (No), the operation proceeds to step 20.

In step 18, the processor A of the electronic controller 290 causes a small charging current to be supplied to the energy storage system 270. In step 19, the processor A of the electronic controller 290 permits the activation of the electric supercharger 140 since the state of charge SOC of the energy storage system 270 has decreased to a level that is low, but not low enough to affect the torque assist provided by the electric supercharger 140.

In step 20, the processor A of the electronic controller 290 permits the activation of both the electric supercharger 140 and motor generator 220 since the state of charge SOC of the energy storage system 270 is sufficiently high. After that, the operation proceeds to step 12.

Figure 6:
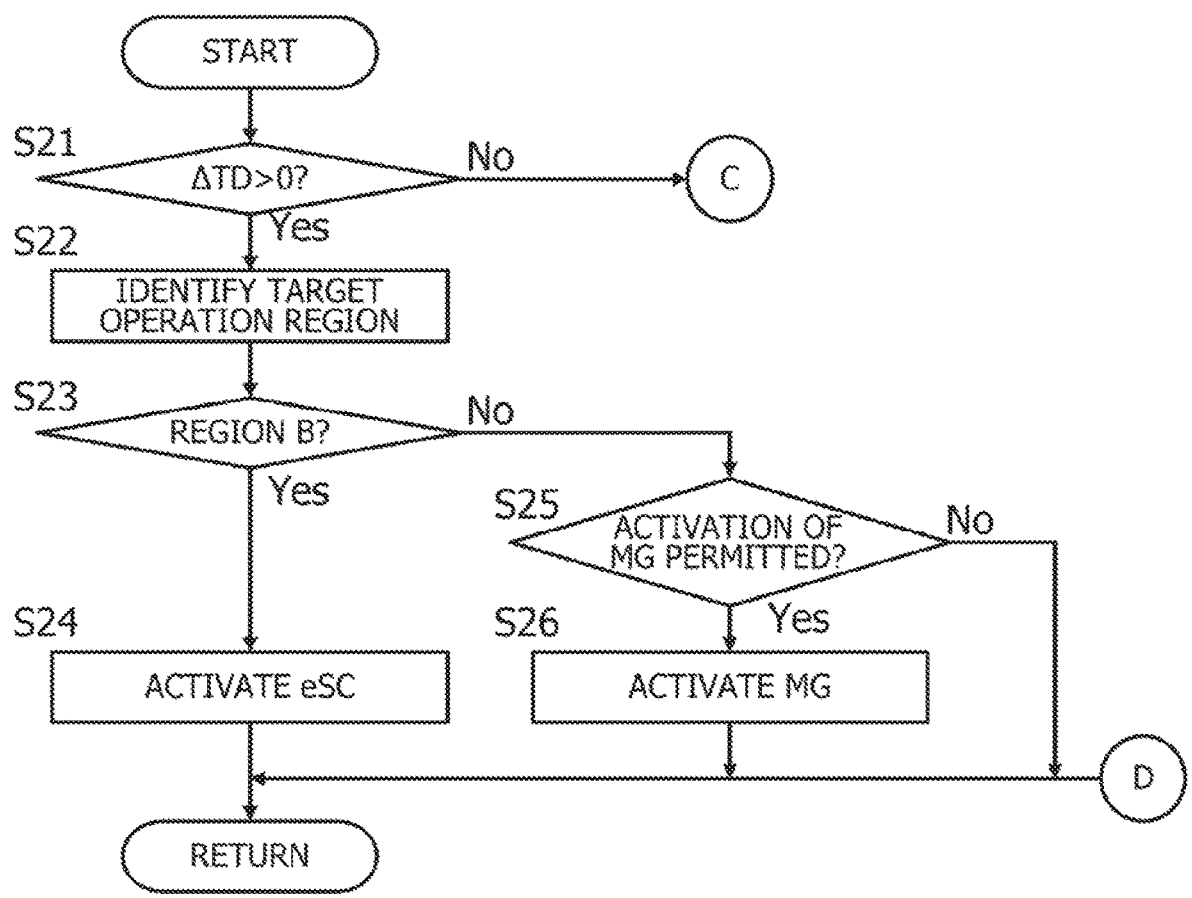
FIG. 6 is a flowchart of an exemplary subroutine of the control program.
Figure 7:
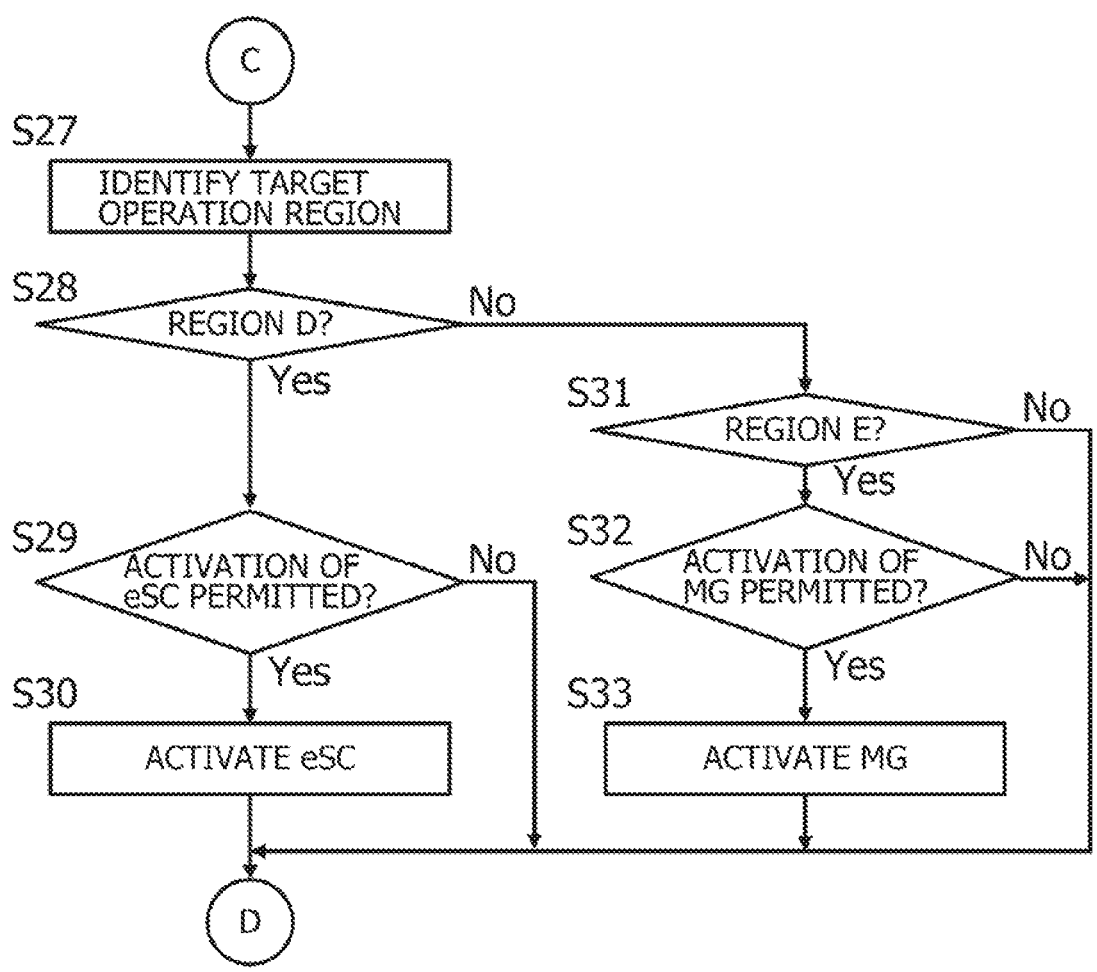
FIG. 7 is a flowchart of the exemplary subroutine of the control program.

FIGS. 6 and 7 show an exemplary subroutine for controlling the electric supercharger 140 and motor generator 220. In step 21, the processor A of the electronic controller 290 determines whether or not the torque difference ΔTD is positive, i.e., whether or not the required torque TDR can be achieved by the engine alone. When the processor A of the electronic controller 290 determines that the torque difference ΔTD is positive, i.e., that the required torque TDR cannot be achieved by the engine alone (Yes), the operation proceeds to step 22. On the other hand, when the processor A of the electronic controller 290 determines that the torque difference ΔTD is 0 or negative, i.e., that the required torque TDR can be achieved by the engine alone (No), the operation proceeds to step 27.

In step 22, the processor A of the electronic controller 290 refers to the torque map shown in FIG. 3 and identifies a target operation region for determining whether to activate the electric supercharger 140 and the motor generator 220. Specifically, the processor A of the electronic controller 290 reads the rotation speed Ne from the rotation speed sensor 300 and reads the accelerator opening ACC from the accelerator opening sensor 310. Then, the processor A of the electronic controller 290 refers to the torque map and identifies one of the regions A to C that corresponds to the rotation speed Ne and the required torque TDR identified based on the accelerator opening ACC. Here, it is not necessary to identify the region D or E as the target operation region at this moment.

In step 23, the processor A of the electronic controller 290 determines whether or not the target operation region is the region B, i.e., whether or not the torque assist by the electric supercharger 140 is required. When the processor A of the electronic controller 290 determines that the target operation region is the region B (Yes), the operation proceeds to step 24. On the other hand, when the processor A of the electronic controller 290 determines that the target operation region is not the region B (No), i.e., that the target operation region is the region C, in which the torque assist by the motor generator 220 is required (No), the operation proceeds to step 25.

In step 24, the processor A of the electronic controller 290 outputs a control signal to the energy storage system 270 so as to activate the electric supercharger 140 and thereby provides torque assist to the diesel engine 100. Specifically, the processor A of the electronic controller 290 may output, to the energy storage system 270, the control signal depending on the torque difference ΔTD so as to provide torque assist that just compensates for the insufficient torque output by the engine alone. This allows for suppressing the electric power consumption of the electric supercharger 140. After that, the operation returns to the main routine. When activating the electric supercharger 140, the processor A of the electronic controller 290 outputs a control signal to the flow channel switching valve 190 to fully close it, thereby causing the entire amount of intake air that has passed through the air cleaner 130 to enter the electric supercharger 140 (the same applies below).

In step 25, the processor A of the electronic controller 290 refers, for example, to the permission flag in the volatile memory C and determines whether or not the activation of the motor generator 220 is permitted. When the processor A of the electronic controller 290 determines that the activation of the motor generator 220 is permitted (Yes), the operation proceeds to step 26. On the other hand, when the processor A of the electronic controller 290 determines that the activation of the motor generator 220 is not permitted (No), the operation returns to the main routine.

In step 26, the processor A of the electronic controller 290 outputs a control signal to the energy storage system 270 so as to activate the motor generator 220 and thereby provides torque assist to the diesel engine 100. Specifically, the processor A of the electronic controller 290 may output, to the energy storage system 270, the control signal depending on the torque difference ΔTD so as to provide torque assist that just compensates for the insufficient torque output by the engine alone. This allows for suppressing the electric power consumption of the motor generator 220. After that, the operation returns to the main routine.

In step 27, the processor A of the electronic controller 290 identifies a target operation region through the same processing as in step 22. In step 28, the processor A of the electronic controller 290 determines whether or not the target operation region is the region D, i.e., whether or not the torque assist may be provided by the electric supercharger 140. When the processor A of the electronic controller 290 determines that the target operation region is the region D (Yes), the operation proceeds to step 29. On the other hand, when the processor A of the electronic controller 290 determines that the target operation region is not the region D (No), the operation proceeds to step 31.

In step 29, the processor A of the electronic controller 290 refers, for example, to the permission flag in the volatile memory C and determines whether or not the activation of the electric supercharger 140 is permitted. When the processor A of the electronic controller 290 determines that the activation of the electric supercharger 140 is permitted (Yes), the operation proceeds to step 30. On the other hand, when the processor A of the electronic controller 290 determines that the activation of the electric supercharger 140 is not permitted (No), the operation returns to the main routine.

In step 30, the processor A of the electronic controller 290 outputs a control signal to the energy storage system 270 so as to activate the electric supercharger 140 and thereby provides torque assist to the diesel engine 100. Specifically, to provide such torque assist, the processor A of the electronic controller 290 may output, to the energy storage system 270, the control signal depending on the difference between the required torque TDR and the torque defining the lower limit of the region D. After that, the operation returns to the main routine.

In step 31, the processor A of the electronic controller 290 determines whether or not the target operation region is the region E, i.e., whether or not the torque assist may be provided by the motor generator 220. When the processor A of the electronic controller 290 determines that the target operation region is the region E (Yes), the operation proceeds to step 32. On the other hand, when the processor A of the electronic controller 290 determines that the target operation region is not the region E (No), the operation returns to the main routine.

In step 32, the processor A of the electronic controller 290 refers, for example, to the permission flag in the volatile memory C and determines whether or not the activation of the motor generator 220 is permitted. When the processor A of the electronic controller 290 determines that the activation of the motor generator 220 is permitted (Yes), the operation proceeds to step 33. On the other hand, when the processor A of the electronic controller 290 determines that the activation of the motor generator 220 is not permitted (No), the operation returns to the main routine.

In step 33, the processor A of the electronic controller 290 outputs a control signal to the energy storage system 270 so as to activate the motor generator 220 and thereby provides torque assist to the diesel engine 100. Specifically, to provide such torque assist, the processor A of the electronic controller 290 may output, to the energy storage system 270, the control signal depending on the difference between the required torque TDR and the torque defining the lower limit of the region E. After that, the operation returns to the main routine.

In the hybrid system as described above, the processor A of the electronic controller 290 calculates the required torque TDR based on the accelerator opening ACC and calculates the torque difference ΔTD by subtracting the base torque TEB from the required torque TDR, when the diesel engine 100 transitions to a steady operation state while the vehicle is traveling. Then, when the torque difference ΔTD is positive, i.e., when the required torque TDR cannot be achieved by the engine alone, the processor A of the electronic controller 290 controls the charging of the energy storage system 270 as well as controls the activation permission of the electric supercharger 140 and the activation permission of the motor generator 220, in accordance with the state of charge SOC of the energy storage system 270.

Specifically, when the state of charge SOC is below the first predetermined value SOC1, the processor A of the electronic controller 290 increases the fuel injection amount to increase power generation of the motor generator 220, and permits the activation of the electric supercharger 140. When the state of charge SOC is equal to or above the first predetermined value SOC and below the second predetermined value SOC2, the processor A of the electronic controller 290 slightly increases the fuel injection amount to slightly increase power generation of the motor generator 220, and permits the activation of both the electric supercharger 140 and motor generator 220. When the state of charge SOC is equal to or above the second predetermined value SOC2, the processor A of the electronic controller 290 permits the activation of both the electric supercharger 140 and motor generator 220 without charging to the energy storage system 270.

Also, even when the torque difference ΔTD is 0 or negative, i.e., when the required torque TDR can be achieved by the engine alone, the processor A of the electronic controller 290 controls the charging of the energy storage system 270 as well as controls the activation permission of the electric supercharger 140 and the activation permission of the motor generator 220, in accordance with the state of charge SOC of the energy storage system 270.

Specifically, when the state of charge SOC is below the first predetermined value SOC1, the processor A of the electronic controller 290 increases the fuel injection amount to increase power generation of the motor generator 220, and prohibits the activation of both the electric supercharger 140 and motor generator 220. When the state of charge SOC is equal to or above the first predetermined value SOC1 and below the second predetermined value SOC2, the processor A of the electronic controller 290 slightly increases the fuel injection amount to slightly increase power generation of the motor generator 220, and permits the activation of the electric supercharger 140. When the state of charge SOC is equal to or above the second predetermined value SOC2, the processor A of the electronic controller 290 permits the activation of both the electric supercharger 140 and motor generator 220 without charging to the energy storage system 270.

When the required torque TDR cannot be achieved by the engine alone, and when the target operation region identified based on the rotation speed Ne and required torque TDR is the region B, in which the torque assist by the electric supercharger 140 is required, the processor A of the electronic controller 290 activates the electric supercharger 140 to provide torque assist. When the required torque TDR cannot be achieved by the engine alone, and when the target operation region is not the region B, i.e., when the target operation region is a region in which the torque assist by the motor generator 220 is required, the processor A of the electronic controller 290 activates the motor generator 220 to provide torque assist only when the activation of the motor generator 220 is permitted. In parallel with the above control, the processor A of the electronic controller 290 also controls the charging of the energy storage system 270. Thus, it is unlikely that there will be too little electric power to activate the electric supercharger 140.

On the other hand, when the required torque TDR can be achieved by the engine alone, and when the target operation region is the region D, in which the torque assist may be provided by the electric supercharger 140, the processor A of the electronic controller 290 activates the electric supercharger 140 to provide torque assist only when the activation of the electric supercharger 140 is permitted. When the required torque TDR can be achieved by the engine alone, and when the target operation region is the region E, in which the torque assist may be provided by the motor generator 220, the processor A of the electronic controller 290 activates the motor generator 220 to provide torque assist only when the activation of the motor generator 220 is permitted.

As described above, even when the required torque TDR can be achieved by the engine alone, the electric supercharger 140 or the motor generator 220 is activated to provide torque assist to the engine when the state of charge SOC of the energy storage system 270 is sufficiently high. Activating the electric supercharger 140 or the motor generator 220 to provide torque assist to the engine will reduce the fuel injection amount correspondingly, and thus further improves the fuel economy of the hybrid system.

Furthermore, the energy storage system 270 is charged not solely by energy regeneration such as brake regeneration, but is charged by combination of energy regeneration and another source that is appropriate in accordance with the state of charge SOC while the vehicle is traveling. This eliminates the need to increase the storage capacity of the energy storage system 270, and thus allows downsizing of the energy storage system 270. Downsizing the energy storage system 270 will reduce its weight, and thereby, for example, reduce the vehicle weight to improve the motion performance of the vehicle. In addition, during charging while the vehicle is traveling, the motor generator 220 applies a load to the engine to convert the load into electric energy in a low-engine load operation range associated with very low fuel economy. Thus, overall fuel economy can be improved.

Furthermore, a vehicle traveling at a low speed is considered to be traveling slowly in high gear position. In such a traveling state, the rotation speed Ne of the diesel engine 100 is low, and thus, the required torque TDR is relatively small. Accordingly, increasing the torque assist by the electric supercharger 140 in such a state will reduce the fuel injection amount correspondingly, and thus, still further improves the fuel economy of the hybrid system.

Figure 8:
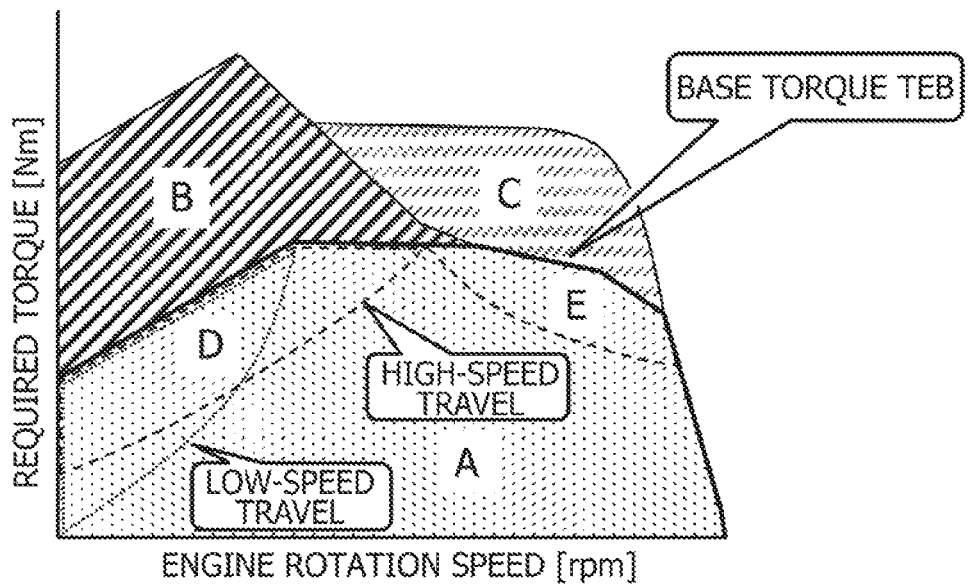
FIG. 8 illustrates a low-speed torque map and a high-speed torque map.

To achieve the above, as a region in which torque assist may be provided by the electric supercharger 140, the nonvolatile memory B of the electronic controller 290 stores a low-speed torque map to be used when the vehicle speed is less than a predetermined value, and a high-speed torque map to be used when the vehicle speed is equal to or above the predetermined value, as shown in FIG. 8. Note that the number of the torque maps corresponding to different vehicle speed ranges is not limited to two; that is, for low speed and for high speed, and a plurality of torque maps may be used corresponding to different vehicle speed ranges. The electronic controller 290 receives the vehicle speed VSP from a vehicle speed sensor (not shown) or another electronic controller.

Figure 9:
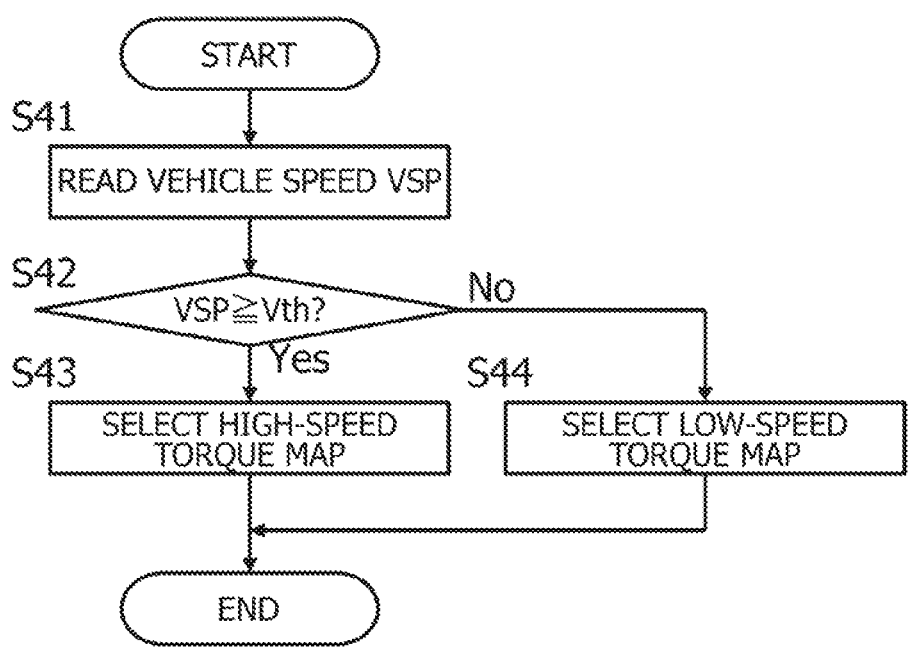
FIG. 9 is a flowchart of exemplary torque map selection processing.

FIG. 9 shows exemplary torque map selection processing that starts to be executed by the processor A of the electronic controller 290 when the diesel engine 100 transitions to the steady operation state while the vehicle is traveling, and then repeatedly executed at predetermined time intervals t2. The length of each predetermined time interval t2 may be the same or different from that of each predetermined time interval t1.

In step 41, the processor A of the electronic controller 290 reads the vehicle speed VSP from a vehicle speed sensor or another electronic controller. In step 42, the processor A of the electronic controller 290 determines whether or not the vehicle speed VSP is equal to or above a predetermined value Vth. Here, the predetermined value Vth is a threshold value for determining whether or not the vehicle is traveling at a low speed. For example, the predetermined value Vth may be set in consideration of the characteristics of the electric supercharger 140 and the like. When the processor A of the electronic controller 290 determines that the vehicle speed VSP is equal to or above the predetermined value Vth, i.e., that the vehicle is traveling at a high speed (Yes), the operation proceeds to step 43. On the other hand, when the processor A of the electronic controller 290 determines that the vehicle speed VSP is below the predetermined value Vth, i.e., that the vehicle is traveling at a low speed (No), the operation proceeds to step 44.

In step 43, the processor A of the electronic controller 290 selects the high-speed torque map. In step 44, the processor A of the electronic controller 290 selects the low-speed torque map.

In the torque map selection processing described above, either the high-speed torque map or the low-speed torque map is selected in accordance with the vehicle speed VSP. Through such selection, the region in which the electric supercharger 140 may be activated is changed. As a result, the region in which torque assist may be provided by the electric supercharger 140 is expanded, and thus, the fuel economy of the hybrid system can be further improved.

Figure 10:
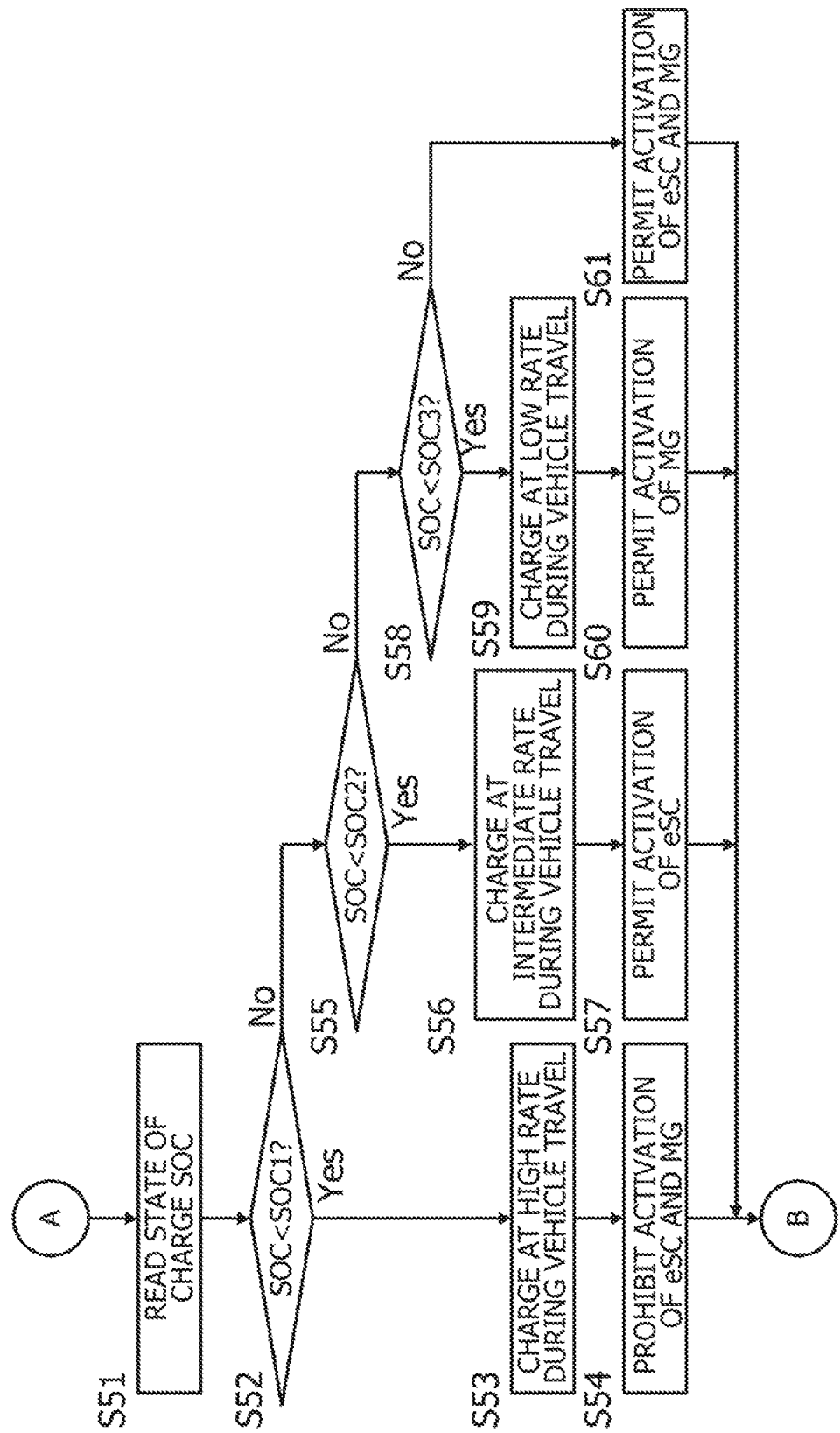
FIG. 10 is a flowchart of another exemplary main routine of the control program.
Figure 11:
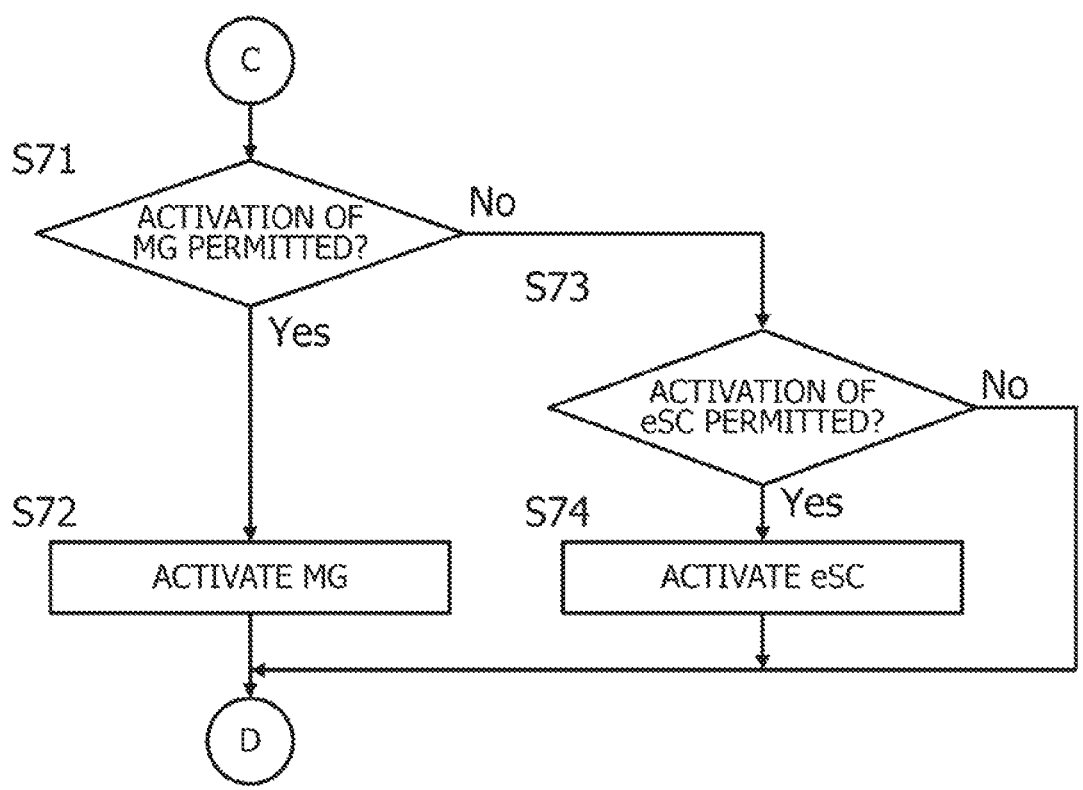
FIG. 11 is a flowchart of another exemplary subroutine of the control program.

When the required torque TDR can be achieved by the engine alone, the charging of the energy storage system 270 and the activation permissions of the electric supercharger 140 and motor generator 220 may be controlled more finely than in the above embodiment. FIG. 10 shows another exemplary main routine of the control program that is executed in place of the exemplary main routine shown in FIG. 5. Note that the same steps of the processing as in the above embodiment will be briefly described so as to avoid redundant description (the same applies below).

In step 51, the processor A of the electronic controller 290 reads the state of charge SOC from the energy storage system 270. In step 52, the processor A of the electronic controller 290 determines whether or not the state of charge SOC is below a first predetermined value SOC1. Here, the first predetermined value SOC1 is a threshold value for determining whether or not the state of charge SOC of the energy storage system 270 decreases to be close to zero. For example, the first predetermined value SOC1 may be set in consideration of the storage capacity of the energy storage system 270 and the like. When the processor A of the electronic controller 290 determines that the state of charge SOC is below the first predetermined value SOC1 (Yes), the operation proceeds to step 53. On the other hand, when the processor A of the electronic controller 290 determines that the state of charge SOC is equal to or above the first predetermined value SOC1 (No), the operation proceeds to step 55.

In step 53, the processor A of the electronic controller 290 causes a large charging current to be supplied to the energy storage system 270. In step 54, the processor A of the electronic controller 290 prohibits the activation of both the electric supercharger 140 and motor generator 220.

In step 55, the processor A of the electronic controller 290 determines whether or not the state of charge SOC is below a second predetermined value SOC2, i.e., whether or not the state of charge SOC is equal to or above the first predetermined value SOC1 and below the second predetermined value SOC2. Here, the second predetermined value SOC2 is a threshold value for determining whether or not the state of charge SOC of the energy storage system 270 decreases much to a level at which the activation of both the electric supercharger 140 and motor generator 220 is difficult. For example, the second predetermined value SOC2 may be set in consideration of the storage capacity of the energy storage system 270 as well as the electric power consumption of the electric supercharger 140 and motor generator 220, and the like. When the processor A of the electronic controller 290 determines that the state of charge SOC is below the second predetermined value SOC2 (Yes), the operation proceeds to step 56. On the other hand, when the processor A of the electronic controller 290 determines that the state of charge SOC is equal to or above the second predetermined value SOC2 (No), the operation proceeds to step 58.

In step 56, the processor A of the electronic controller 290 causes a medium charging current to be supplied to the energy storage system 270. Here, the value of the medium charging current is set between those of the large and small charging currents. In step 57, the processor A of the electronic controller 290 permits the activation of the electric supercharger 140.

In step 58, the processor A of the electronic controller 290 determines whether or not the state of charge SOC is below a third predetermined value SOC3, i.e., whether or not the state of charge SOC is equal to or above the first predetermined value SOC2 and below the third predetermined value SOC3. Here, the third predetermined value SOC3 is a threshold value for determining whether or not the state of charge SOC of the energy storage system 270 decreases to a level at which the activation of the electric supercharger 140 is possible but the activation of the motor generator 220 is difficult. For example, the third predetermined value SOC3 may be set in consideration of the storage capacity of the energy storage system 270 as well as the electric power consumption of the electric supercharger 140 and motor generator 220. When the processor A of the electronic controller 290 determines that the state of charge SOC is below the third predetermined value SOC3 (Yes), the operation proceeds to step 59. On the other hand, when the processor A of the electronic controller 290 determines that the state of charge SOC is equal to or above the third predetermined value SOC3 (No), the operation proceeds to step 61.

In step 59, the processor A of the electronic controller 290 causes a small charging current to be supplied to the energy storage system 270. In step 60, the processor A of the electronic controller 290 permits the activation of the motor generator 220.

In step 61, the processor A of the electronic controller 290 permits the activation of both the electric supercharger 140 and motor generator 220 since the state of charge SOC of the energy storage system 270 is sufficiently high.

Executing the above control program allows more fine control of the charging of the energy storage system 270 as well as the activation permissions of the electric supercharger 140 and motor generator 220 than in the above embodiment. Furthermore, the activation of the electric supercharger 140, the activation of the motor generator 220, and the activation of both the electric supercharger 140 and motor generator 220 are sequentially permitted as the state of charge SOC of the energy storage system 270 increases. This contributes to improvement in fuel economy of the hybrid system. Note that, although the charging control shown in FIG. 10 is performed in four stages depending on the state of charge SOC of the energy storage system 270, it may be performed in five or more stages.

When the required torque TDR can be achieved by the engine alone, torque assist may be provided by either the electric supercharger 140 or the motor generator 220 in accordance with the state of charge SOC of the energy storage system 270, regardless of which of the regions D and E includes the target operation region. FIG. 1 shows another exemplary subroutine of the control program that is executed in place of the exemplary subroutine shown in FIG. 7.

In step 71, the processor A of the electronic controller 290 refers to the permission flag in the volatile memory C and determines whether or not the activation of the motor generator 220 is permitted. When the processor A of the electronic controller 290 determines that the activation of the motor generator 220 is permitted (Yes), the operation proceeds to step 72. On the other hand, when the processor A of the electronic controller 290 determines that the activation of the motor generator 220 is not permitted (No), the operation proceeds to step 73.

In step 72, the processor A of the electronic controller 290 outputs a control signal to the energy storage system 270 so as to activate the motor generator 220 and thereby provides torque assist to the diesel engine 100.

In step 73, the processor A of the electronic controller 290 refers to the permission flag in the volatile memory C and determines whether or not the activation of the electric supercharger 140 is permitted. When the processor A of the electronic controller 290 determines that the activation of the electric supercharger 140 is permitted (Yes), the operation proceeds to step 74. On the other hand, when the processor A of the electronic controller 290 determines that the activation of the electric supercharger 140 is not permitted (No), the operation returns to the main routine.

In step 74, the processor A of the electronic controller 290 outputs a control signal to the energy storage system 270 so as to activate the electric supercharger 140 and thereby provides torque assist to the diesel engine 100.

By executing the above control program, the electric supercharger 140 or the motor generator 220 is activated to provide torque assist when the state of charge SOC of the energy storage system 270 is sufficiently high, even when the required torque TDR can be achieved by the engine alone. Here, in contrast to the above embodiment, torque assist is provided by either the electric supercharger 140 or the motor generator 220 in accordance with the state of charge SOC of the energy storage system 270, regardless of which of the regions D and E includes the target operation region. Thus, when the state of charge SOC is sufficiently high, a higher priority may be given to the torque assist by the motor generator 220, which is available with no fuel injection. Thus, the fuel economy of the hybrid system can be improved more than in the above embodiment.

Note that, when the state of charge SOC of the energy storage system 270 is sufficient, both the electric supercharger 140 and motor generator 220 may be used to provide torque assist. In short, even when the required torque can be achieved by the engine alone, at least one of the electric supercharger 140 and motor generator 220 is activated to provide torque assist when the state of charge SOC of the energy storage system 270 is sufficiently high.

Note that the engine of the hybrid system does not have to be provided with the turbocharger 150 rotated by exhaust energy. When the turbocharger 150 is not provided, the term "engine alone" refers to the diesel engine 100 alone.

REFERENCE SYMBOL LIST

100 Diesel engine (Engine)
140 Electric supercharger
220 Motor generator
270 Energy storage system
290 Electronic controller (Controller)
320 Fuel injection device

The invention claimed is:

1. A controller for a hybrid system including an electric supercharger, a motor generator, and an energy storage system for supplying electric power to the electric supercharger and the motor generator, the controller controlling the electric supercharger and the motor generator in accordance with a required torque,
   wherein, even when the required torque can be achieved by an engine alone, the controller activates at least one of the electric supercharger and the motor generator to provide torque assist to the engine when a state of charge of the energy storage system is sufficiently high,
   wherein the controller sequentially permits activation of the electric supercharger, activation of the motor generator, and activation of both the electric supercharger and the motor generator as the state of charge of the energy storage system increases.

2. The controller for the hybrid system according to claim 1, wherein the controller provides torque assist to the engine when the engine is in a steady operation state.

3. The controller for the hybrid system according to claim 1, wherein the controller changes a region in which the electric supercharger is activated in accordance with a vehicle speed.

4. The controller for the hybrid system according to claim 1, wherein, when the controller activates at least one of the electric supercharger and the motor generator to provide torque assist to the engine, the controller reduces an amount of fuel injected into the engine in accordance with an amount of the torque assist.

5. The controller for the hybrid system according to claim 1, wherein the controller increases a fuel injection amount in accordance with the state of charge of the energy storage system so as to cause the motor generator to charge the energy storage system.

6. A method for controlling a hybrid system using a controller for the hybrid system, the hybrid system including an electric supercharger, a motor generator, and an energy storage system for supplying electric power to the electric supercharger and the motor generator, the controller controlling the electric supercharger and the motor generator in accordance with a required torque,
   wherein, even when determining that the required torque can be achieved by an engine alone, the controller activates at least one of the electric supercharger and the motor generator to provide torque assist to the engine when a state of charge of the energy storage system is sufficiently high,
   wherein the controller sequentially permits activation of the electric supercharger, activation of the motor generator, and activation of both the electric supercharger and the motor generator as the state of charge of the energy storage system increases.

7. The method for controlling the hybrid system according to claim 6, wherein the controller provides torque assist to the engine when the engine is in a steady operation state.

8. The method for controlling the hybrid system according to claim 6, wherein the controller changes a region in which the electric supercharger is activated in accordance with a vehicle speed.

9. The method for controlling the hybrid system according to claim 6, wherein, when the controller activates at least one of the electric supercharger and the motor generator to provide torque assist to the engine, the controller reduces an amount of fuel injected into the engine in accordance with an amount of the torque assist.

10. The method for controlling the hybrid system according to claim 6, wherein the controller increases a fuel injection amount in accordance with the state of charge of the energy storage system so as to cause the motor generator to charge the energy storage system.

* * * * *